United States Patent
Beck

(10) Patent No.: US 8,186,120 B2
(45) Date of Patent: May 29, 2012

(54) STEEL SUPPORT FRAME FOR A PHOTOVOLTAIC SYSTEM USABLE AS A CARPORT

(75) Inventor: Bernhard Beck, Volkach OT Dimbach (DE)

(73) Assignee: Adensis GmbH, Dresden (DE)

( * ) Notice: Subject to any disclaimer, the term of this patent is extended or adjusted under 35 U.S.C. 154(b) by 73 days.

(21) Appl. No.: 12/893,574

(22) Filed: Sep. 29, 2010

(65) Prior Publication Data

US 2011/0072742 A1    Mar. 31, 2011

(30) Foreign Application Priority Data

Sep. 30, 2009  (DE) .......................... 10 2009 043 779

(51) Int. Cl.
*E04C 3/40*         (2006.01)
(52) U.S. Cl. ............................. 52/644; 52/86; 52/652.1
(58) Field of Classification Search ................ 52/73, 86, 52/644, 651.05, 651.07, 651.1, 652.1
See application file for complete search history.

(56) References Cited

U.S. PATENT DOCUMENTS

| | | | | |
|---|---|---|---|---|
| 1,336,324 | A * | 4/1920 | Waern | 52/639 |
| 3,925,942 | A * | 12/1975 | Hemmelsbach | 52/86 |
| 4,262,460 | A * | 4/1981 | Bertin | 52/64 |
| 4,676,045 | A * | 6/1987 | Ellen | 52/745.2 |
| 5,444,946 | A * | 8/1995 | Zeigler | 52/86 |
| 6,293,057 | B1 * | 9/2001 | Amos Hays | 52/79.1 |
| 7,609,019 | B2 | 10/2009 | Beck et al. | |
| 2007/0068565 | A1 | 3/2007 | Rivera-Pomales | |
| 2009/0101191 | A1 | 4/2009 | Beck et al. | |
| 2009/0134297 | A1 | 5/2009 | Beck | |

FOREIGN PATENT DOCUMENTS

| | | |
|---|---|---|
| CH | 601 617 | 7/1978 |
| DE | 32 32 838 A1 | 3/1984 |
| DE | 202009000434 | 5/2009 |
| FR | 2.142.608 | 2/1973 |
| FR | 2.169.482 | 9/1973 |
| GB | 2 199 055 A | 6/1988 |

* cited by examiner

*Primary Examiner* — Christine T Cajilig
(74) *Attorney, Agent, or Firm* — Henry M. Feiereisen; Ursula B. Day

(57) ABSTRACT

A base frame for a parking lot roof equipped with photovoltaic modules is proposed, wherein two mirror-symmetrically constructed halves are provided, with each half having an inner arc constructed of three inner struts and an outer arc constructed of three outer struts, which are connected with each other by cross struts. The structure is light-weight and can be easily manufactured.

17 Claims, 5 Drawing Sheets

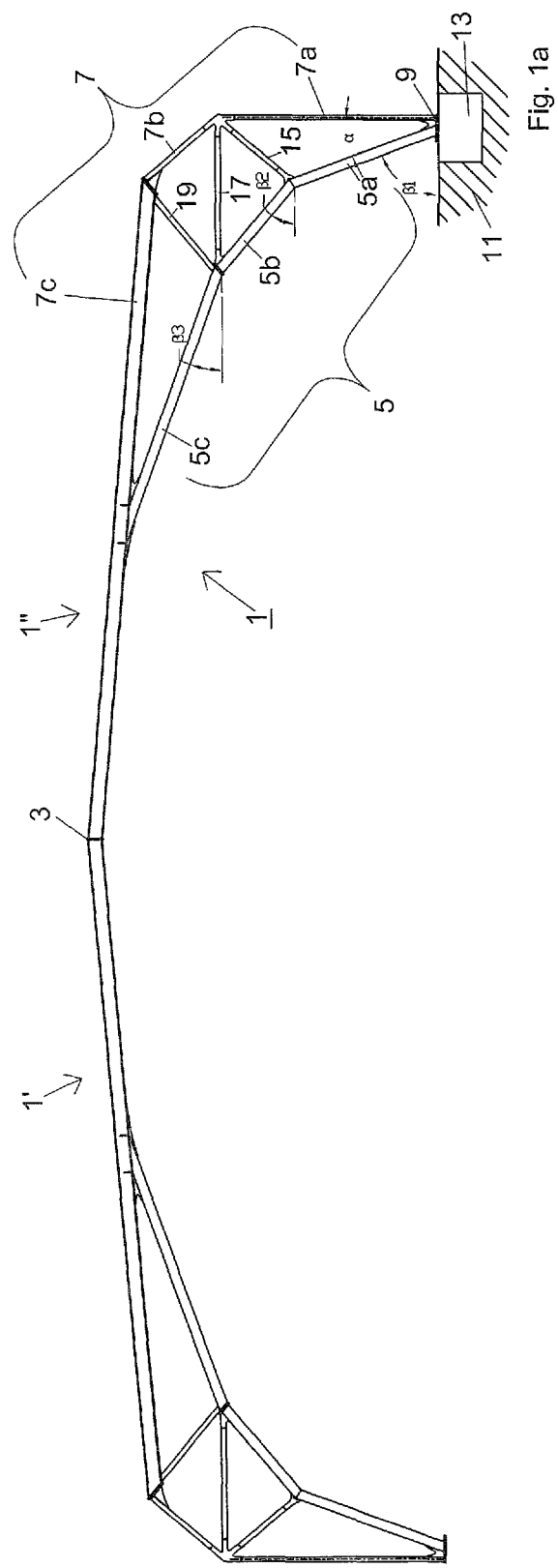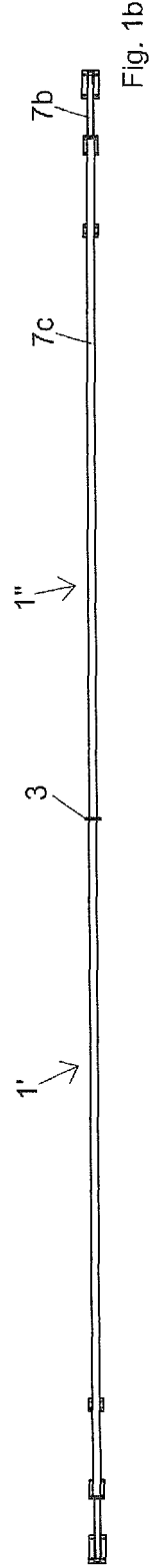

1

STEEL SUPPORT FRAME FOR A PHOTOVOLTAIC SYSTEM USABLE AS A CARPORT

CROSS-REFERENCES TO RELATED APPLICATIONS

This application claims the priority of German Patent Application, Serial No. 10 2009 043 779.7, filed Sep. 30, 2009 pursuant to 35 U.S.C. 119(a)-(d), the content of which is incorporated herein by reference in its entirety as if fully set forth herein.

BACKGROUND OF THE INVENTION

The present invention relates to a base frame for a roof of a parking lot equipped with photovoltaic modules.

The following discussion of related art is provided to assist the reader in understanding the advantages of the invention, and is not to be construed as an admission that this related art is prior art to this invention.

Steel frames suitable to support photovoltaic systems are known. With these frames, typically supports are driven into the ground to form two parallel rows of different height. These rows are provided with cross struts on which module rails are mounted. The actual photovoltaic modules are then mounted on the module rails with a preferred slope. This slope is intended to optimally capture the sun rays and to convert the solar energy into electrical energy.

On the other hand, carports or parking lots with a large roof area exist, where the automobiles are protected from heat and/or inclement weather.

It would therefore be desirable and advantageous to obviate prior art shortcomings and to combine these two functions, in order to attain with one and the same frame both a substructure for photovoltaic modules as well as protection against the sun for motor vehicles parked underneath the frame. It would also be desirable to provide a cost-effective support structure, wherein the top side facing the sky is as large as possible and has the most advantageous angle of incidence.

SUMMARY OF THE INVENTION

According to one aspect of the present invention, a base frame for a parking lot roof equipped with photovoltaic modules includes two mirror-symmetrically constructed halves, with each half having an inner arc constructed of three inner struts, an outer arc constructed of three outer struts and first, second and third cross struts, wherein in each half a first inner strut and a first outer strut are secured to a ground at an anchor location, from where the first inner strut and the first outer strut extend by enclosing an acute angle with each other;

each of a second inner strut connected to the first inner strut and a second outer strut connected to the first outer strut extend at a shallower angle with respect to a horizontal than the first inner strut and the first outer strut;

each of a third inner strut connected to the second inner strut and a third outer strut connected to the second outer strut extend at a shallower angle with respect to the horizontal than the second inner strut and the second outer strut; and the first cross strut connecting upper ends of the first inner strut and the first outer strut with each other, the third cross strut connecting upper ends of the second inner strut and the second outer strut with each other, and the second cross strut connecting an upper end of the second inner strut with a lower end of the second outer strut, with an end of the third outer strut protruding a considerable distance from an end of the third inner strut.

S An end of each half is connected with an end of the other half at a center of the parking lot roof.

The term arc is meant to indicate that each of the struts is arranged in a corresponding arc, but that the struts themselves need not have an arcuate structure. Advantageously, each of the inner arc and the outer arc have only three struts, with no additional struts necessary for forming the arc. Three struts are sufficient for each arc to achieve the desired stability. An arc having more struts would unnecessarily increase the material consumption and manufacturing complexity.

The photovoltaic modules are later placed on the third outer strut. This is preferably accomplished indirectly by using additional cross struts which are mounted transversely across several base frames which are arranged in parallel and mounted on a roof panel. To attain a large usable surface area for the PV modules, the end of the third outer strut should protrude between two and six meter, in particular between three and five meter, from the end of the third inner strut. When the third outer strut has a length between six and twelve meter, then the end of the third inner strut is connected to the third outer strut approximately at the center of the third outer strut. The ends of the each of the third outer struts of a half are combined at a connecting point located at a height between 3500 mm and 5000 mm.

Suitable dimensions are selected so that I) the three inner struts are constructed of square tubing having dimensions of 120 mm×80 mm×3.6 mm with a variation of 30% for each listed dimension, II) the first and the second outer strut are constructed of square tubing having dimensions of 60 mm×60 mm×2.5 mm with a variation of 30% for each listed dimension, III) the three cross struts are made of square tubing having dimensions of 60 mm×60 mm×2.5 mm with a variation of 30% for each listed dimension, and IV) the third outer strut is made of an IPE beam, in particular an IPE 180 beam with a variation of 30% for each listed dimension.

To increase the stability, the beginning and the ends of the participating struts form nodes at the locations where they are merged, with a retaining reinforcement, for example a profile shoe, a shaped reinforcement plate, an interior bolt frame and the like are provided. The abutting struts can initially be welded to each other and subsequently provided with the reinforcement, in which they can be, for example, also welded, glued or screwed together. Depending on the selection of the type of reinforcement, the nodes may initially be formed together with the reinforcements and subsequently either only the struts are connected with the reinforcements or the struts may be welded to each other or otherwise connected together with the reinforcements in a common processing step.

As described above, for attaining a large usable surface area for mounting the PV modules, several mutually parallel base frames may be set up in an aligned row. The aforementioned cross struts are then mounted parallel to one another in the direction of the row. The spacing between the transverse struts is to be adapted to the span of the roof material to be installed so that the module clips can be installed on the roof material and the PV modules can be secured between two opposing module clips. With parking roof structures having a considerable length as well as a considerable width, several rows of basic modules with halves mounted back-to-back may be arranged next to each other, wherein the corresponding upper ends of adjacent first outer struts are connected with each other. An unobstructed space for the passage of fire engines or other trucks can be left between blocks of, for example, three adjacent rows.

Advantageously, the first or lowest outer strut is oriented vertically relative to the ground, whereas the first inner strut is then oriented inwardly and encloses an acute angle with the first outer strut. In general, for obtaining the arcuate shape, each following strut extends somewhat flatter, meaning more horizontal, than the preceding strut.

The parameters for the angles between the individual struts are indicated in FIG. 1c. An angular deviation of plus/minus 5° of the indicated angular relationships between the participating struts is permissible, without affecting the purpose and function of the base frame.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1a a side view often a base frame with two mirror-symmetric halves;

FIG. 1b a top view of FIG. 1a;

DETAILED DESCRIPTION OF PREFERRED EMBODIMENTS

Figure 1C:
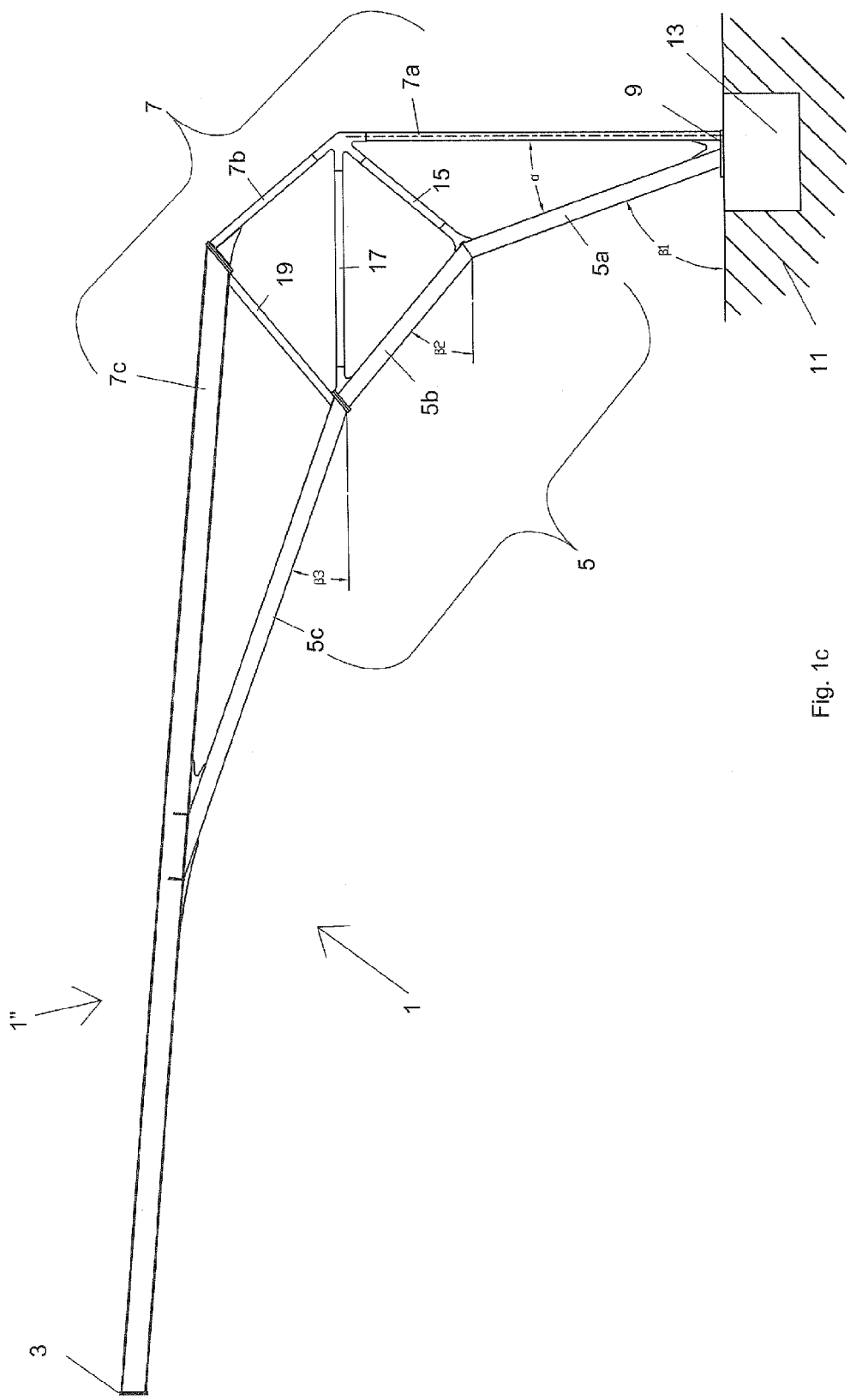
FIG. 1c a half of the base frame, in an enlarged view.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIGS. 1a to 1c, there is shown a base frame 1 constructed of two halves 1', 1", which after installation are merged at a connecting point 3 where they are connected. The halves 1' and 1" has an identical structure, but are mounted mirror-symmetrically to each other.

Each half is constructed of an inner arc 5 made of three inner struts $5a$, $5b$, $5c$ and of an outer arc 7 made of three outer struts $7a$, $7b$, $7c$. The first struts $5a$, $7a$ are anchored close to each other at a common point 9 in the ground 11, for example, by casting them in an embedded foundation 13. Each of the struts $5a$ to $5c$ and $7a$ to $7c$ are straight, but form according to their mutual arrangement the respective arcs 5 and 7.

The first inner strut $5a$ and the first outer strut $7a$ enclose an acute angle $\alpha$, wherein the first outer strut $7a$ stands essentially vertical on the ground 11 and the first inner strut $5a$ is oriented inwardly at the angle $\alpha$. The upper ends of the first inner strut $5a$ and of the first outer strut $7a$ connected with each other by way of a first cross strut 15. The second inner strut $5b$ and the second outer strut $7b$ are connected at the two connecting locations, wherein both struts $5b$, $7b$ extend at a flatter angle relative to the ground 11 than the first inner strut $5a$ and the first outer strut $7a$. As can be seen from the labeled angles $\beta$, the angle $\beta_1$ formed between the first inner strut $5a$ and the ground is greater than the angle $\beta_2$ formed between the second inner strut $5b$ and the ground 11. Like the first struts, the upper ends of the second inner strut $5b$ and of the second outer strut $7b$ are also connected with each other by a third cross strut 19. In addition, a second cross strut 17 is provided which connects the upper end of the second inner strut $5b$ with the lower end of the second outer strut $7b$. It should be noted that in the depicted embodiment the upper end of an arcuate strut 5 simultaneously also forms the lower end of the following arcuate strut 5. With respect to the second cross strut 17, it could be stated that it extends between the upper end of the first outer strut $7a$ and the lower end of the third inner strut $5c$.

The third inner strut $5c$ and the third outer strut $7c$ also extend at a flatter angle with respect to the horizontal than the second inner strut and the second outer strut, respectively, in the illustrated example at the angle $\beta_3$.

As seen in FIG. 1, the end of the second outer strut $7c$ protrudes a considerable distance from the end of the third inner strut $5c$ and hence forms in connection with additional base frames a large area for placement of the photovoltaic modules. The respective ends of the mirror-symmetrically installed halves 1' and 1" are connected with each other at the center of the parking lot roof, i.e., at the connecting point 3.

Figure 2:
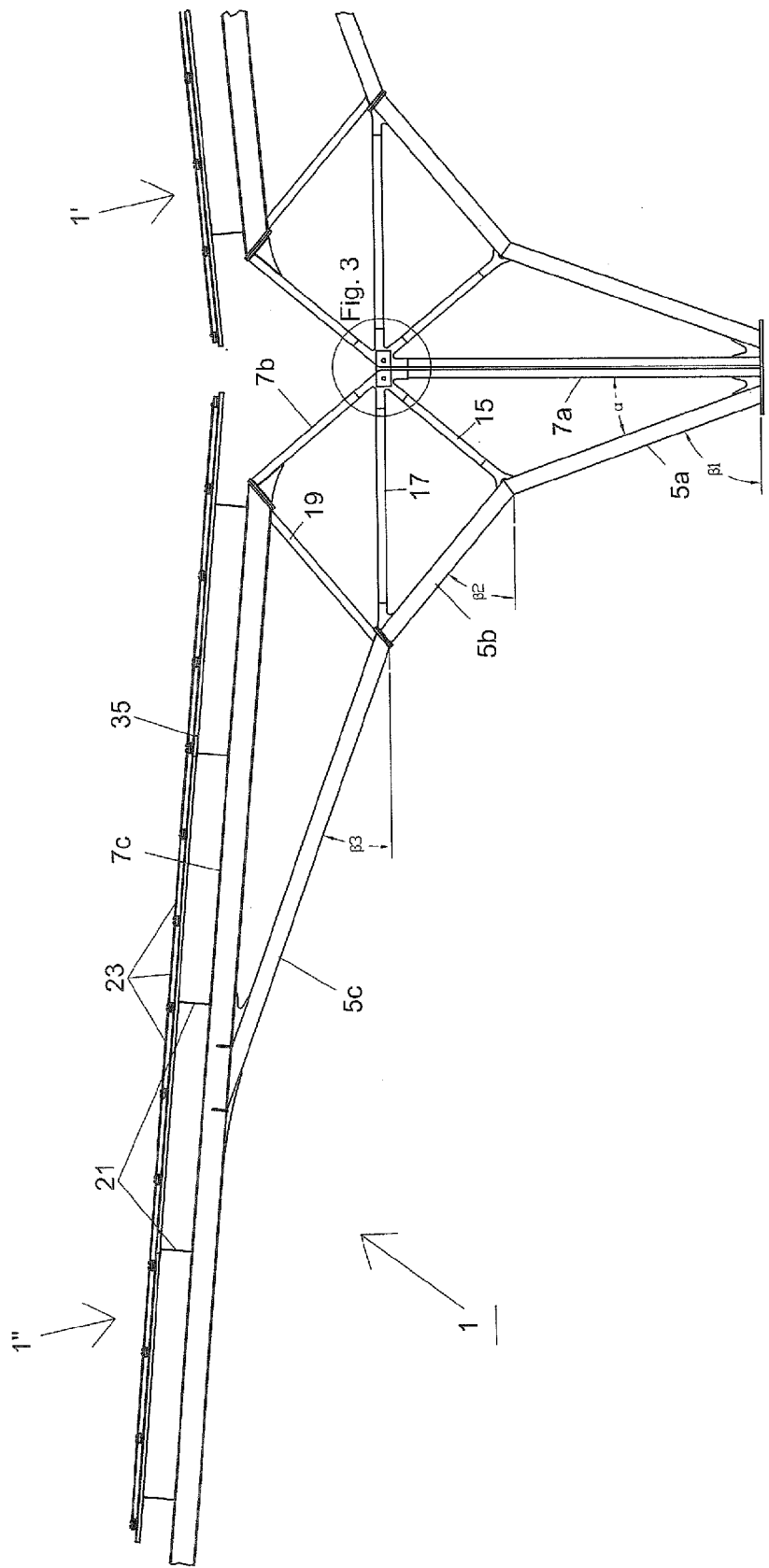
FIG. 2 a diagram of two halves mounted back-to-back.

FIG. 2 illustrates the two halves 1 and 1" in a back-to-back arrangement. In this Figure, longitudinal beams 21 are illustrated which extend into the drawing plane. The longitudinal beams 21 cross several support frames 1 which are also arranged perpendicular to the drawing plane, and are used for attaching a roof panel 35 on which module clips (not shown) are affixed, with a plurality of photovoltaic motives 23 being clamped between their damping parts.

Figure 3:
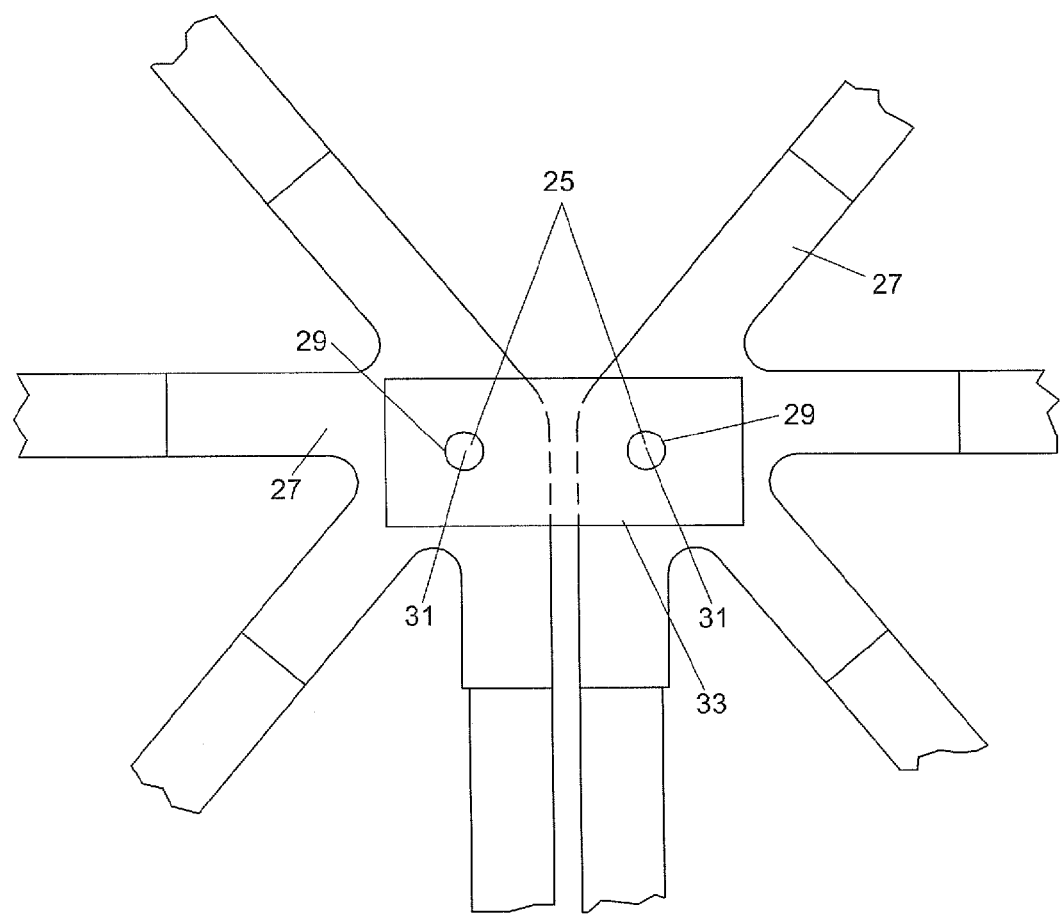
FIG. 3 a detail of FIG. 2.

FIG. 3 shows the section circled in FIG. 2, which illustrates in more detail a node 25. At the point 25, the upper end of the first outer strut $7a$, the lower end of the second outer strut $7b$, and one end of the first cross strut 15 and one end of the second cross strut 17, i.e., a total of four ends, merge. The four ends are reinforced with one gusset plate (or if another gusset plate is arranged on the backside, with two gusset plates), which is fixedly connected at all four ends, for example welded or screwed together.

Corresponding bores 29, through which corresponding bolts 31 extend, are provided in the area of the nodes 25 of the support frame halves 1' and 1" arranged back-to-back. Each of the bolts 31 extends simultaneously through another opening of a butt plate 33 which connects the two halves 1' and 1" with each other. In this way, the relative position of the halves 1' and 1" to each other is fixed. Other fastening and reinforcement means customarily used in structural steel work may be used instead of a gusset plate, for example an arrangement which shoes, into which a respective end of the struts $7a$, $7b$, 15 and 17 is inserted. Similar reinforcement means are provided at the other intersecting points of struts 5, 7, 15, 17 and 19.

Figure 4:
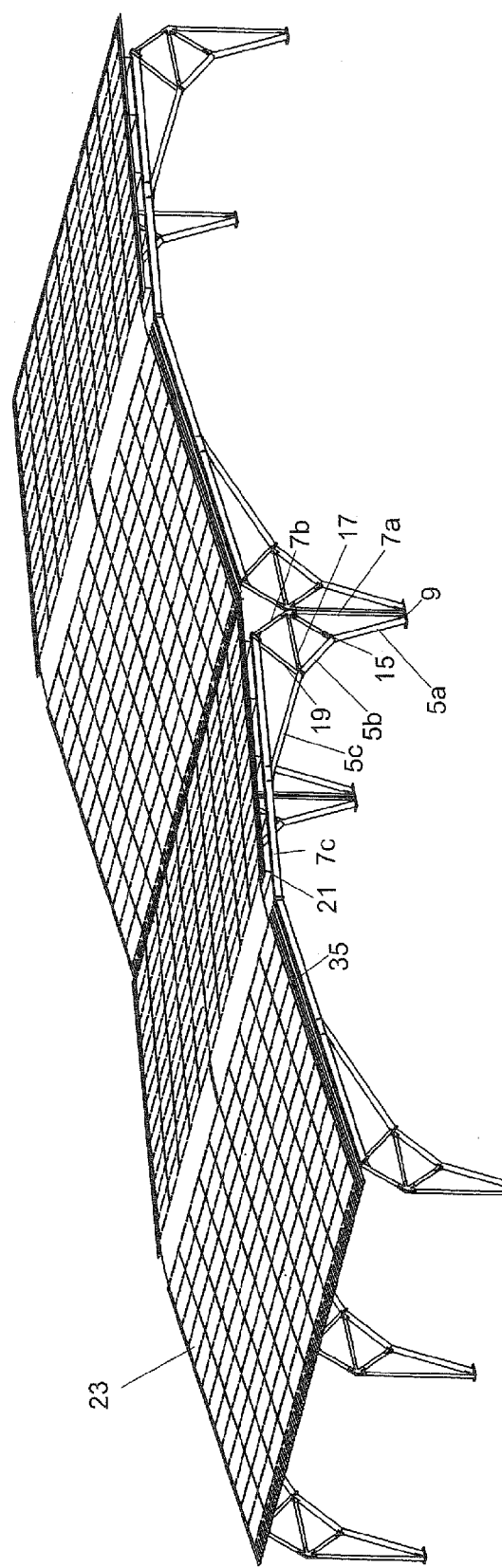
FIG. 4 a perspective view of a large-area parking lot roof.

FIG. 4 shows a perspective view of several support frames arranged in a row, which are again combined into several rows to cover a large area parking lot. The area is used anyway for parking and can now have a dual use by simultaneously generating energy with photovoltaics.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A base frame for a parking lot roof equipped with photovoltaic modules, comprising:

two mirror-symmetrically constructed halves, with each half comprising an inner arc constructed of three inner struts, an outer arc constructed of three outer struts and first, second and third cross struts, wherein in each half a first inner strut and a first outer strut are secured to a ground at an anchor location, from where the first inner strut and the first outer strut extend by enclosing an acute angle with each other;

each of a second inner strut connected to the first inner strut and a second outer strut connected to the first outer strut extend at a shallower angle with respect to a horizontal than the first inner strut and the first outer strut;

each of a third inner strut connected to the second inner strut and a third outer strut connected to the second outer strut extend at a shallower angle with respect to the horizontal than the second inner strut and the second outer strut;

the first cross strut connecting upper ends of the first inner strut and the first outer strut with each other, the third cross strut connecting upper ends of the second inner strut and the second outer strut with each other, and the second cross strut connecting an upper end of the second inner strut with a lower end of the second outer strut, with an end of the third outer strut protruding a distance from an end of the third inner strut, wherein an end of each half is connected with an end of the other half to form a center of the parking lot roof.

2. The base frame of claim 1, wherein the end of the third outer strut protrudes between two and six meters from the end of the third inner strut.

3. The base frame of claim 1, wherein the end of the third outer strut protrudes between three and five meters from the end of the third inner strut.

4. The base frame of claim 1, wherein the third outer strut has a length between six and twelve meters.

5. The base frame of claim 1, wherein the inner struts are made of square tubing having dimensions 120 mm×80 mm×3.6 mm, with a tolerance of 30%.

6. The base frame of claim 1, wherein the first and the second outer strut is made of square tubing having dimensions 60 mm×60 mm×2.5 mm, with a tolerance of 30%.

7. The base frame of claim 1, wherein the first, second and third cross struts are made of square tubing having dimensions 60 mm×60 mm×2.5 mm, with a tolerance of 30%.

8. The base frame of claim 1, wherein the third outer strut is made of an IPE beam with a tolerance of 30%.

9. The base frame of claim 1, wherein the third outer strut is made of an IPE 180 beam with a tolerance of 30%.

10. The base frame of claim 1, wherein ends of each of the struts are merged at nodes, with a retaining reinforcement connecting the struts at the nodes.

11. The base frame of claim 10, wherein the retaining reinforcement is selected from the group consisting of a profile shoe, a shaped gusset plate and an interior bolt frame.

12. The base frame of claim 1, wherein ends of each of the struts are merged at nodes, with the merged ends being welded to one another.

13. The base frame of claim 1, wherein several base frames are arranged mutually parallel and aligned in a row.

14. The base frame of claim 1, wherein several base frames are arranged back-to-back, and wherein each of the upper ends of adjacent first outer struts are connected with one another.

15. The base frame of claim 1, wherein the first outer strut extends perpendicular to ground.

16. The base frame of claim 1, wherein ends of respective third outer struts of a half are merged a point located at a height between 3500 mm and 5000 mm.

17. The base frame of claim 1, wherein the struts are straight.

* * * * *